Patented Feb. 15, 1927.

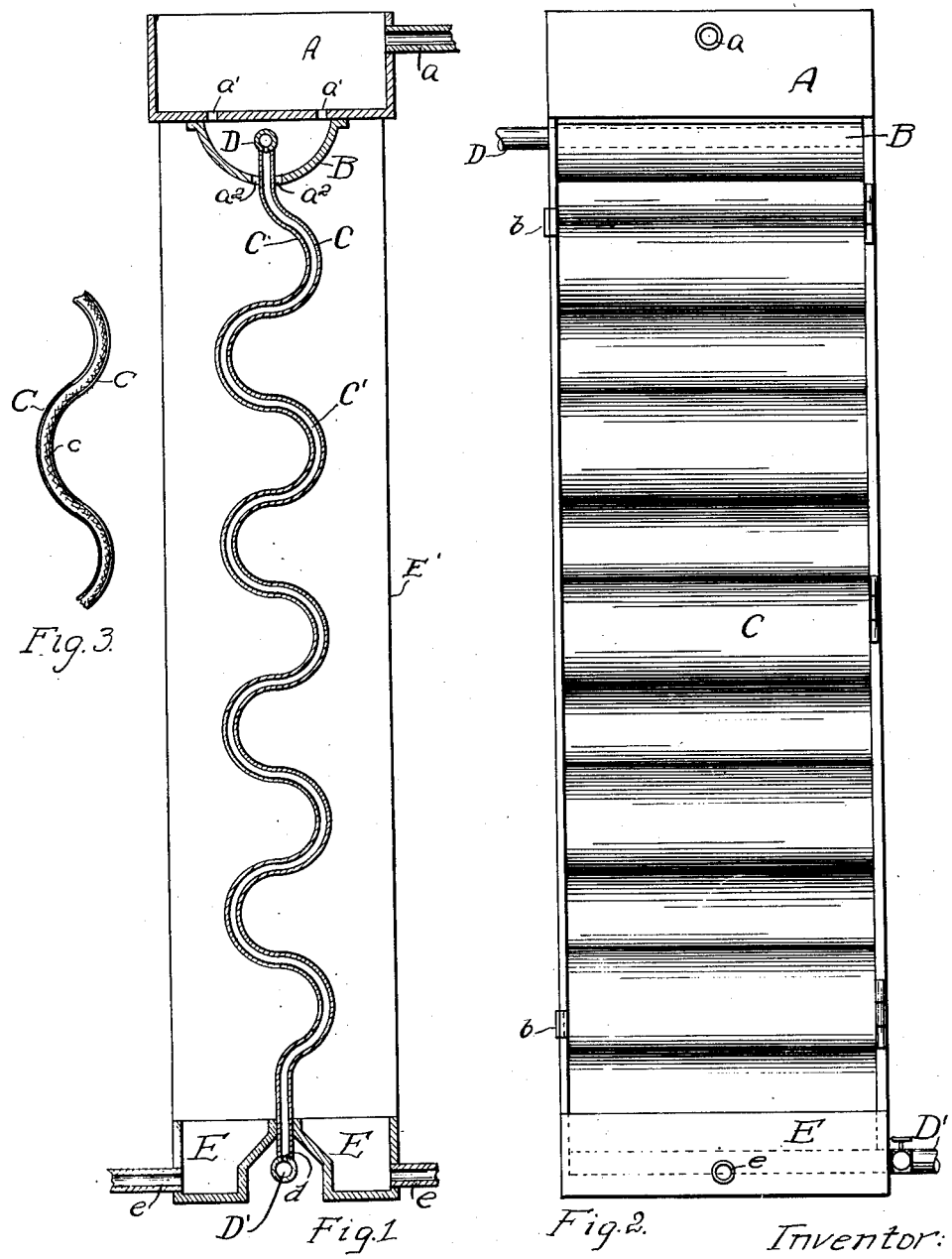

1,617,867

UNITED STATES PATENT OFFICE.

HARRY B. RUDD, OF CHICAGO, ILLINOIS, ASSIGNOR TO ELECTROPURE CORPORATION, OF DETROIT, MICHIGAN, A CORPORATION OF DELAWARE.

REGENERATIVE HEAT-EXCHANGE DEVICE.

Application filed December 1, 1920. Serial No. 427,554.

My invention has for its object the production of apparatus designed to be used for the purpose of preheating liquids which are to be passed through a process of sterilization which requires the temperature thereof to be raised. By preheating the liquid before it is introduced into the sterilizing chamber the process is greatly facilitated in the matter of time necessary for the preheating as well as in the current necessary to affect a preheating of the fresh liquid.

This apparatus is designed to be used more particularly with apparatus for sterilizing liquid such as that shown in my pending application, Serial No. 399,037, in which sterilized liquid is discharged from the apparatus at a temperature of approximately 160 degrees Fahrenheit, and requires cooling before being bottled.

It is an object of my invention to utilize the heat units present in the discharging sterilized liquid to preheat or regenerate the fresh liquid as it is flowing through the channel or reservoir on its way to the sterilizer.

It is also an object of my invention to so arrange this preheating mechanism that it will occupy a comparatively small space and be located in close proximity to the sterilizing apparatus in order to receive the full benefit of the heat in the discharging liquid, at the same time the fresh liquid is being supplied directly to the apparatus for sterilization, and thereby not require any additional handling.

It is also an object of my invention to obtain a more perfect regeneration of the liquid by causing an equal volume of liquid to flow at the same rate of speed on the inside and on the outside of the regenerator thereby obtaining almost complete equalization of temperatures at any given point in the process.

These and other objects will be apparent from the following description to those skilled in the art.

In the accompanying drawings I have illustrated what I now consider the preferred form of the more essential features of my invention and in these drawings:—

Figure 1 is a vertical sectional view of my invention,

Figure 2 is a side view of the same,

Figure 3 is a fragmentary view of the corrugated members illustrating the resilient material between the edges thereof.

Referring to the drawings A represents a receptacle having an intake pipe $a$, which extends to the discharge chamber of the sterilizer (not here shown). The receptacle A is provided with openings $a'$ in the bottom thereof.

B is a receiving trough beneath the receptacle A and in which the liquid container in the receptacle A is discharged. Through the bottom of this trough B extends the upper end of a corrugated structure formed of two side members C—C positioned in a vertical or upright direction beneath the discharge trough B. These two corrugated members C—C are preferably formed of sheet metal and are spaced apart from the top to the bottom thereof to form a channel $C'$ of small cross sectional area. Between the outer edges of the corrugated members C—C, I provide a strip of more or less resilient material, such as rubber $c$, which serves to hold the members C—C out of contact with each other and which forms a complete closure between the two members C—C, between the outer edges thereof.

The meeting edges of one side of these corrugated members may be hinged together, and means are provided upon the opposite edges of said members as at $b$ for engaging or locking the parts together while the apparatus is being used which will permit easy disengagement when necessary for cleansing purposes, etc.

At the top of these corrugated members, C—C, is a discharge tube D, which extends to the sterilizing apparatus, not here shown. Extending across the bottom of the channel or runway $C'$, is an intake pipe $D'$ which has a plurality of openings $d$ therein extending in an upward direction whereby the liquid being introduced into said channel may be caused to flow across the entire surface thereof from the bottom to the top of said channel.

The liquid entering the pipe $D'$ is under pressure which forces it upwardly in a thin film like stream through the narrow channel $C'$. Valves $d'$ for regulating the intake may be arranged in the pipe $D'$ whereby the flow of the liquid may be increased or diminished as desired.

When the apparatus is in use, the heated liquid passing from the sterilizing apparatus, flows into the receptacle A through the pipe a, and discharges therefrom through the openings a' into the trough B. Narrow slotted openings, a² are provided in the trough B on each side of the corrugated members, C—C, whereby the heated liquid in the trough B may be discharged upon the outside opposite sides of said corrugated members, C—C. The corrugations retard the progress of the downwardly flowing liquid which is passing toward the receptacle E located at the bottom thereof, where it is discharged through the pipes e at a temperature within a few degrees of the temperature of the incoming cold liquid.

The inflowing liquid entering through pipe D' is under pressure and is passing upwardly through the channel C' at the same rate of speed and in the same volume that the outflowing liquid is passing downwardly on the outside of the corrugated members C—C. The effect of the passage of the heated and cool liquid in close proximity enables me to utilize the latent heat of the outflowing liquid to warm or preheat the inflowing liquid, and to utilize the lower temperature of the inflowing liquid to cool the discharging or outflowing liquid.

The inner channel C' through which the fresh liquid is flowing permits it to receive the heat radiated from the downwardly flowing liquid whereby the temperature of the inflowing liquid will be raised within a few degrees of the temperature of the outflowing liquid from the time it enters the channel C' at the bottom thereof until it is discharged through the pipe D at the top thereof.

E' is a casing enclosing the regenerative apparatus to protect the downflowing liquid from recontamination by any germs or other impurities in the atmosphere.

I claim:—

1. A regenerative device comprising a runway formed of two vertically disposed plates corrugated in a horizontal direction, strips of resilient material positioned between the edges of said corrugated members, means for locking said plates in closed position when in use, means for causing liquids of different temperature to traverse said corrugations on the outside and inside of said members, and means for regulating the transit of said liquid.

2. A regenerative apparatus comprising a casing, a receptacle at the top and bottom of said casing, a vertical runway within said casing, said runway comprising two oppositely facing horizontally corrugated members extending from the top to the bottom respectively, means for locking said members together in spaced apart relationship to each other, means for regulating the flow of liquids in opposite directions over and through said runway to effect an equalization of temperature of said liquids.

In testimony whereof I have signed this specification.

HARRY B. RUDD.